United States Patent [19]

Abbondanti

[11] Patent Number: 4,847,747

[45] Date of Patent: Jul. 11, 1989

[54] COMMUTATION CIRCUIT FOR LOAD-COMMUTATED INVERTER INDUCTION MOTOR DRIVES

[75] Inventor: Alberto Abbondanti, Plum Boro, Pa.

[73] Assignee: Westinghouse Electric Corp., Pittsburgh, Pa.

[21] Appl. No.: 249,527

[22] Filed: Sep. 26, 1988

[51] Int. Cl.[4] .................................... H02M 7/515
[52] U.S. Cl. ...................... 363/138; 363/37; 363/96; 318/802; 318/510
[58] Field of Search .............. 363/35, 37, 40, 96, 363/135, 136, 137, 138; 318/800, 801, 802, 803, 806–812, 510, 512

[56] References Cited

U.S. PATENT DOCUMENTS 4,713,743 12/1987 Abbondanti ............... 363/138

FOREIGN PATENT DOCUMENTS 2216676 10/1973 Fed. Rep. of Germany ...... 363/138
0881954 11/1981 U.S.S.R. ....................... 363/138
0888306 12/1981 U.S.S.R. ....................... 363/138

OTHER PUBLICATIONS

"A Circuit for Two-Stage Artificial Commutation of an Inverter" by V. P. Bakharerskii and A. M. Utevski in Direct Current, Jun. 1957, pp. 153–159.
"Analysis of a Novel Forced-Commutation Starting Scheme for a Load-Commutated Synchronous Motor Drive" by Robert L. Steigerwald and Thomas A. Lipo in IEEE Trans. IA-15, Jan./Feb. 1979, pp. 14–24.
"The Synchronous Machine as a Self-Controlled Converter-Fed Motor" by Dieter Kollensperger in Siemens Review XXXV, (1968), No. 5, pp. 195–201.

Primary Examiner—Peter S. Wong
Attorney, Agent, or Firm—C. M. Lorin

[57] ABSTRACT

In a load commutated inverter induction motor drive a parallel capacitor bank is used in part to force-commutate the thyristors of the inverter as triggered by auxiliary thyristors and turned off by the other part of the capacitor bank.

8 Claims, 5 Drawing Sheets

COMMUTATION CIRCUIT FOR LOAD-COMMUTATED INVERTER INDUCTION MOTOR DRIVES

FIELD OF THE INVENTION

The present invention is related to Load-Commutated Induction Motor (LCI/IM) Drives in general, and in particular to the commutation circuit of such motor drives.

BACKGROUND OF THE INVENTION

Load Commutated Inverter (LCI) Synchronous Motor Drives using a thyristor inverter bridge do not need forced commutation means, because automatic thyristor turn-off is achieved with a synchronous motor as the load, if it has a leading phase angle with respect to the load voltage. For a given load, increasing sufficiently the field will produce such leading power factor. See, for instance:

"The Synchronous Machine as a Self-Controlled Converter-Fed Motor" by Dieter Kollensperger in Siemens Review XXXV (1968) No. 5, pp. 195–201; and U.S. Pat. No. 4,713,743 of Dec. 15, 1987 (Alberto Abbondanti).

With an induction motor, however, this possibility no longer exists. The load power factor is lagging for all machine excitation levels. Therefore, specific circuitry must be used to allow a leading phase angle to take place, thereby providing natural commutation of the inverter bridge. To this effect, a general solution is to add a large capacitor bank in parallel with the motor, so that the lagging load power factor be overcompensated, the net result being that leading VAR's are supplied to the composite load. Accordingly, the resultant leading power factor angle will insure natural commutation of the inverter poles. In such case, the motor drive is referred to as a Load-Commutated inverter Induction Machine (LCI/IM) drive. Thus, when the power factor of the inductor motor has been overcompensated to produce a leading load power factor to a current-source, in principle the induction motor behaves much like a synchronous motor as far as current-source inverter (CSI) is concerned, for a significant speed range.

However, the size of the capacitor bank has to be taken into account, especially in view of the speed range of the drive. The torque may vary with the square of the speed, while the load-speed profile should accommodate 100% torque at 100% speed. Increasing the speed range requires increasing the capacitance added in parallel. The demand for more capacitance may also come from the use of reactors to insure a limited range of the current during commutation and protect the thyristors. When reducing the speed of the motor, the added capacitance, even in excess, will improve the effectiveness of the load commutation process, however, not all the way. At low speed the "commutation lead time" due to the capacitors in parallel quickly drops below any adopted safe limit. Commutation at low and even very low speed is necessary, if only because the motor drive must be brought up to speed from the start. Therefore, like with a synchronous motor drive, there is a need in LCI/IM systems for an inverter forced-commutation arrangement allowing start-up. Since such commutation function is not required beyond the low end of the speed range, when the motor voltage is moderate and the switching frequency is reduced, it must be devised at low cost and with a limited performance capability.

Prior art techniques, other than natural commutation, for commutating an inverter may be typically seen in:

"A Circuit for Two-Stage Artificial Commutation of an Inverter" by V. P. Bakharerskii and A. M. Utevski in Direct Current, June 1957, pp. 153–159; and "Analysis of a Novel Forced-Commutation Starting Scheme for a Load-Commutated Synchronous Motor Drive" by Robert L. Steigerwald and Thomas A. Lipo in IEEE Trans. IA-15 Jan./Feb. 1979, pp. 14–24.

SUMMARY OF THE INVENTION

In a Load-Commutated Inverter Induction Motor (LCI/IM) drive, including a thyristor bridge inverter and a capacitor bank in parallel with the induction motor for providing a leading power factor to the inverter, a forced-commutation circuit, interposed between the DC terminals of the bridge and the input lines of the motor, is actuated at low speed in relation to the offgoing and the oncoming thyristors of the bridge for one DC terminal polarity, and such forced-commutation circuit is turned off by the capacitor bank. The forced-commutation circuit includes auxiliary capacitors partaking in the operation of the capacitor bank at normal speed. More specifically, the forced-commutation circuit according to the invention includes capacitors which are wye-connected between the motor input lines and a neutral point, and such neutral point is the nodal point between two auxiliary thyristors connected to the DC terminals, respectively, one of the auxiliary thyristors being fired in relation to the DC terminal corresponding to the oncoming and offgoing thyristors of the bridge. The parallel capacitors may be wye-connected, or delta-connected, with respect to the motor input lines. Additional commutation assistance is provided in a first mode at very low speed and for start-up of the drive. The forced-commutation circuit according to the present invention is initiated at low speed, and is discontinued thereabove.

DETAILED DESCRIPTION OF THE INVENTION

Figure 1:
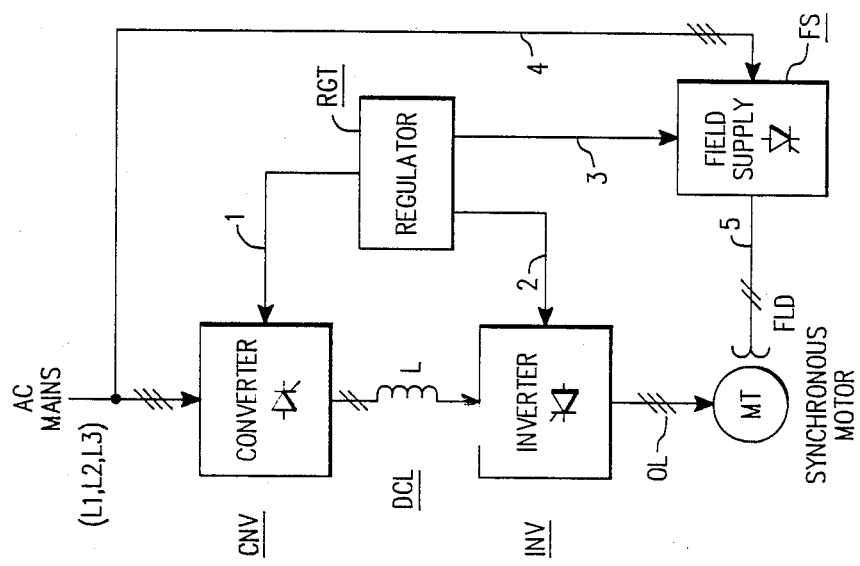
FIG. 1 is a block diagram of a LCI Synchronous Motor Drive of the prior art.

Referring to FIG. 1, a Load-Commutated Inverter (LCI) Synchronous Motor drive is shown in block diagram. The currents in lines (L1,L2,L3) from the mains are converted by a converter CNV into DC and the DC-Link DCL including a reactor L is connected to an inverter INV generating AC power, via lines OL, to the synchronous motor MT. A regulator RGT controls the converter (by line 1), the inverter (by line 3) and a field supply FS (by line 4) for the excitation of the field winding FLD (by line 5) of the motor. It is assumed that the inverter bridge uses thyristors without the provision of forced-commutation to turn off the thyristors. This is the case if the current impressed on the load has a leading phase angle with respect to the load voltage. This is possible with a synchronous motor, since for a given torque, increasing sufficiently the field will produce a leading power factor.

Figure 2:
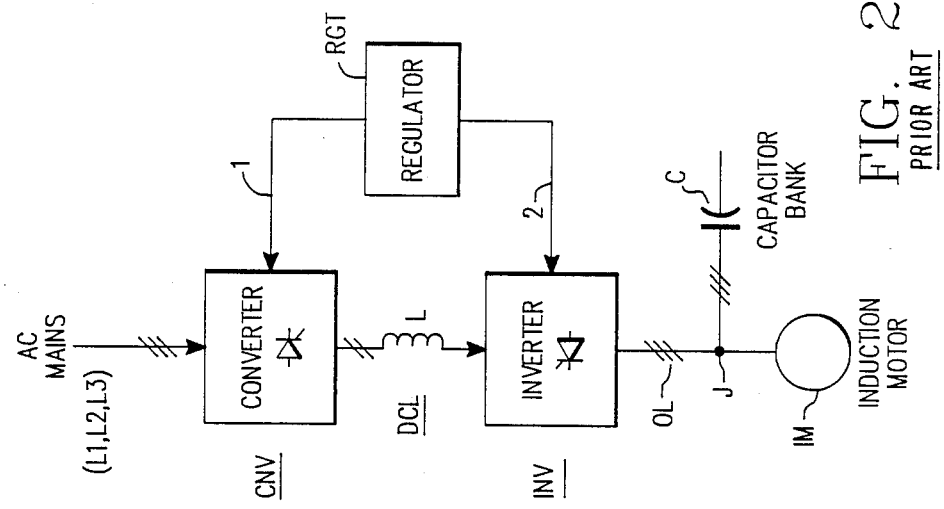
FIG. 2 shows a conventional LCI Induction Motor Drive provided with a parallel capacitor bank for natural commutation of the inverter bridge.

With an induction motor, however, there is no field excitation available, and the load power factor is always lagging, whatever the level of excitation. Therefore, external load components will be required in order to modify the load power factor and create a leading phase angle allowing natural commutation of the thyristors of the inverter. FIG. 2 shows such a drive, in which a large capacitor bank C has been added (junction J with lines OL) in parallel with the induction motor IM. There is also a regulator RGT controlling the firing angle of the converter CNV (line 1) and the inverter INV (line 2).

Figure 3:
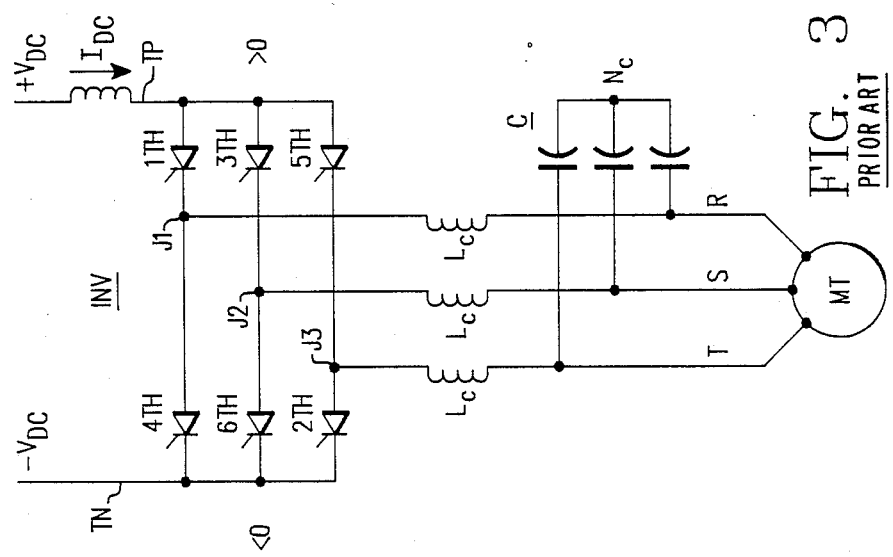
FIG. 3 shows the inverter-motor interface of a drive like in FIG. 2, where reactors are used to limit the rate-of-change of the current during commutation, for thyristor protection.

FIG. 3 is a more detailed view of the drive of FIG. 2, at the interface with thyristors 1TH–6TH of the inverter bridge for each pole (1Th, 4TH with nodal point J1 for phase R; 3TH, 6TH with nodal point J2 for phase S and 5TH, 2TH with nodal point J3 for phase T, mounted across the positive and negative terminals TP and TN of the DC-Link and under a voltage (+VDC and −VDC). The parallel capacitor bank C is shown with a neutral point Nc. Reactors Lc are inserted on the AC line (OL) phases R, S, T of the motor.

Figure 4:
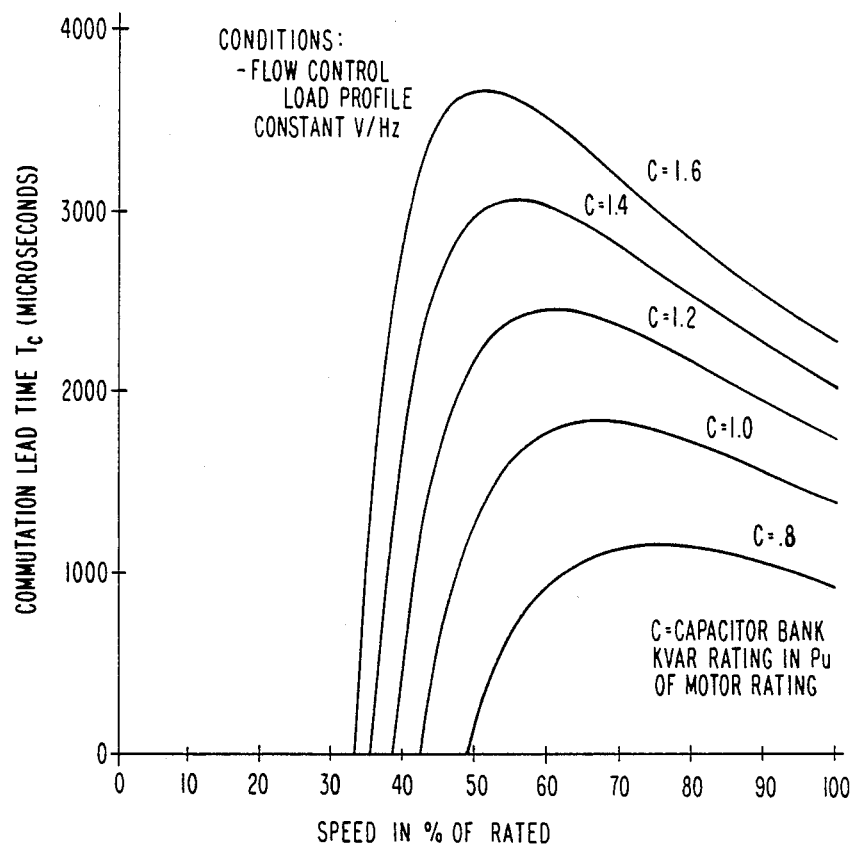
FIG. 4 is a graphic representation of the effect of increasing the size of the capacitor bank upon the commutation lead time as a function of speed.

Referring to FIG. 4, a series of curves is given for successive values 1.6, 1.4, 1.2, 1.0 and 0.8 of the KVAR rating of capacitor bank C (in p.u.). These curves represent the commutation lead time Tc (in microseconds) as a function of rated speed in %, thus, up to 100% at full speed, assumed to be at full torque. These curves illustrate the effects of the presence of a capacitor bank of varying size on the thyristor turn-off conditions for varying speeds. The load-speed profile shown is typical of flow control applications, i.e. where the torque varies with the square of the speed. The motor excitation is assumed to be kept at rated level by ensuring that motor voltage varies proportionally to speed. The "commutation lead time" Tc, given on the vertical axis, is the time elapsing between the zero-crossing instant of the fundamental current on one motor line and the zero-crossing instant of the fundamental line-to-neutral voltage of the same motor line. This time is closely related to the time of reverse-bias of the recovering, or offgoing, thyristor. This has been discussed in U.S. Pat. No. 4,713,743 of A. Abbondanti. This patent is hereby incorporated by reference. Typically, for a given type of thyristor, requiring say 500 μs to recover, the permissible operating range in the LCI mode for a given value of C corresponds to the speed range for which: Tc > (500 μs + the required safety margin).

It appears from FIG. 4 that the capacitor bank value C can be chosen so as to obtain inherent LCI operation (that is, sufficiently high values of Tc) at rated speed. As the speed drops, Tc generally rises, with an even more certain and effective load commutation process taking place. However, there is a limit to such safe speed decrease, because, beyond a certain value, the value of Tc drops below any adopted limit for safe commutation. Increasing the value of C will somewhat displace the limit into the lower speed region, but there will always be a point of non-operability of the motor drive if the speed has become low enough. This means that running at speeds lower than the permissible range, will result in commutation failure. The permissible range is wide enough to satisfy the range requirements for most flow control applications. Nevertheless, there will be a need, at least at start up when accelerating the drive from standstill, to pass through such critical range at low speed before reaching the useful range of operation. Therefore, means must be provided to permit commutation of the inverter at low speed.

Figure 5:
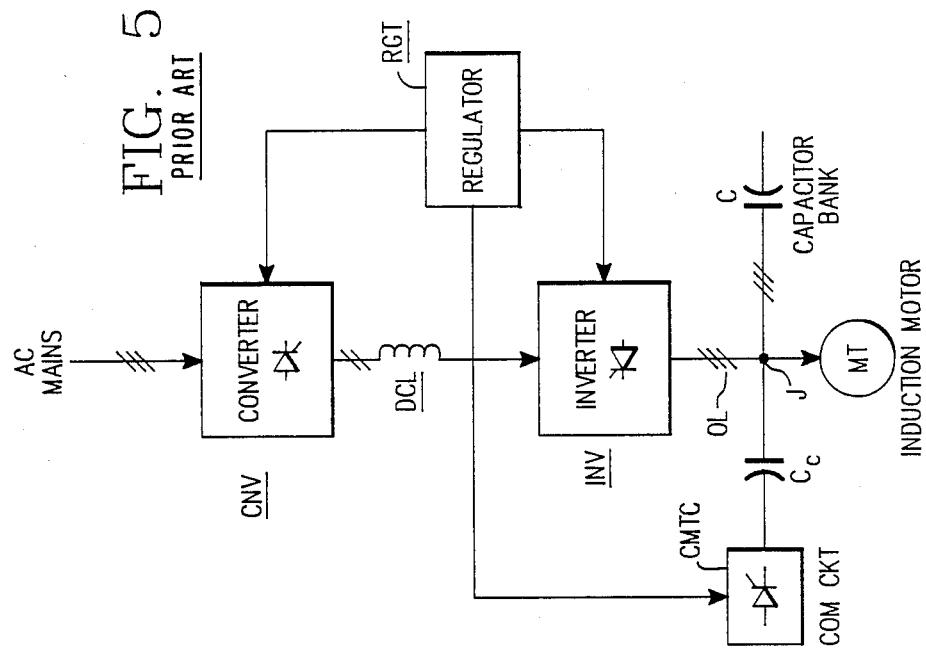
FIG. 5 is a block diagram of a conventional LCI/IM drive provided with commutation circuitry specially added for start-up of the drive.

FIG. 5 shows an LCI/IM system provided with an arrangement for forced-commutation of the inverter at start up. A commutation circuit CMTC coupled to an auxiliary capacitor Cc is connected in parallel to the motor, like capacitor bank C, but controlled during start-up by the regulator (line 6). The gist of the invention is to design such a commutation circuit while taking into consideration that the function of such a circuit is not essential to the main and normal operation of the drive and that it will operate only in a range where the load current is low, when the motor voltage is moderate and the switching frequency reduced. It will then be a low cost circuit, of limited performance capability, and responding to the need with minimal impact on the overall system operation.

Figure 6:
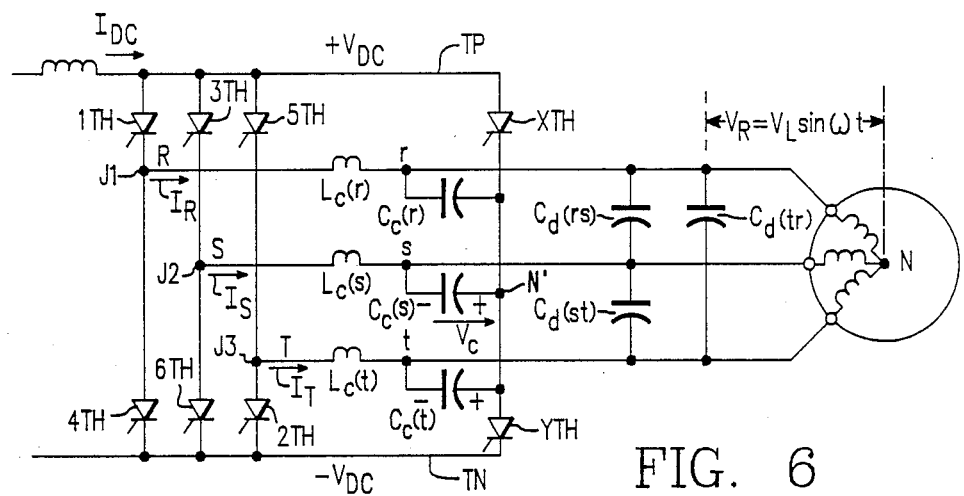
FIG. 6 is an illustrative representation of the forced-commutation circuit according to the present invention.
Figure 7:
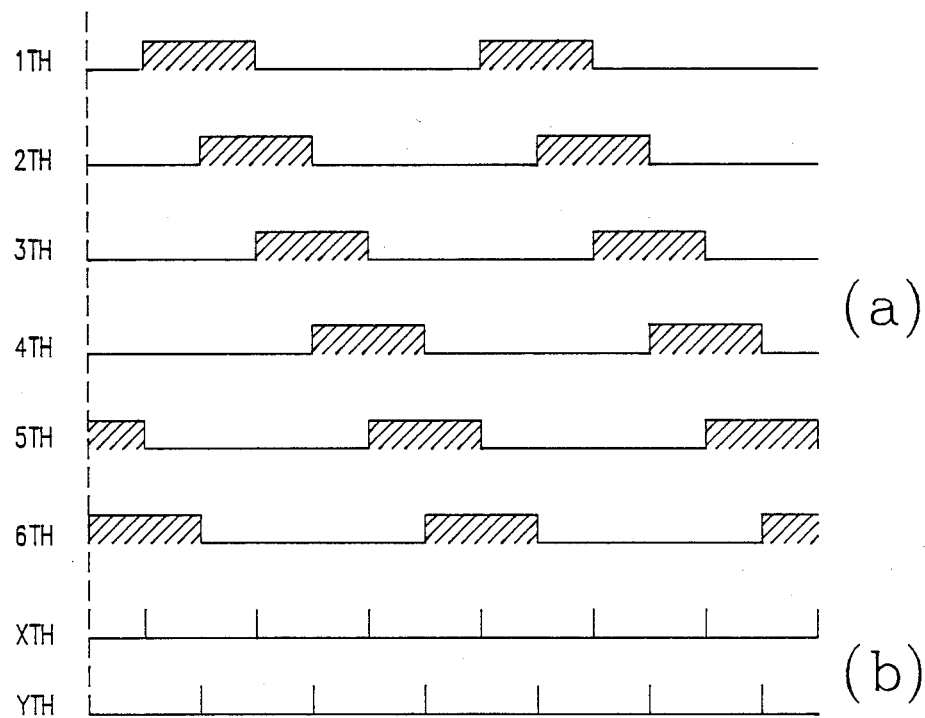
FIG. 7 illustrates with curves the sequential operation of the thyristors of the inverter bridge and of the thyristors of the forced-commutation circuit according to the present invention.

FIG. 6 is illustrative of a commutation circuit providing, according to the present invention, forced commutation of the inverter in a LCI/IM drive at start-up. The philosophy is essentially to provide a capacitor bank divided in two parts (Cd and Cc), both being used at higher speed but only one (Cc) for the critical speed range of forced-commutation. The first part is shown as three capacitors in delta across the motor input lines (phases R, S, T) line-to-line, namely $C_d(rs)$, $C_d(st)$ and $C_d(tr)$. The inverter bridge includes thyristors 1TH and 4TH for one pole across terminals TP and TN, with junction J1, for phase line R, the latter including a reactor $L_c(r)$, and carrying a voltage $V_R = V_L \sin \omega t$ onto the motor stator winding of neutral point N. Similarly, the second pole has thyristors 3TH and 6TH about nodal point J2 for phase line S, the latter with its own reactor $L_c(s)$. The third pole has thyristors 5TH and 6TH about junction J3 for the third phase line T, with a reactor $L_c(t)$. According to the present invention, capacitors $C_c(r)$ for phase line R at junction r, $C_c(s)$ for phase line S at junction s, and $C_c(t)$ for phase line T at junction t, are connected in wye to the respective phase lines with a common neutral point N'. In addition, thyristors XTH and YTH are provided joinging such neutral point N to terminals TP and TN, respectively. The main part of the capacitor bank so defined will be referred as $C_d$, the second part as $C_c$. The wye-connected second part $C_c$ represents only a small fraction of the total installed capacitive KVA. In the illustration, the main part is shown delta-connected, although, it is understood that it could be wye-connected. However, the second and smaller part $C_c$ will always be wye-connected, as shown. Auxiliary thyristors XTH and YTH are gated at three times the rate of gating of the inverter bridge thyristors. Thyristor XTH is gated each time a bridge thyristor of the upper row is gated (1TH, 3TH, 5TH), whereas thyristor YTH is gated each time a bridge thyristor of the lower row is gated (4TH, 6TH, 2TH). Firing of the thyristors is shown in FIG. 7. Assuming thyristors 5TH and 6TH are conducting, which implies a current path from junction J3 (current $I_t$) through the motor windings and to junction J2 (current $I_s$), if 5TH becomes the offgoing thyristor, XTH is fired in order to assist by forced-commutation the recovery of thyristor 5TH, while thyristor 1TH is the oncoming thyristor to conduct with 6TH. The relationship between the alternative pulses (illustrated under (b)) triggering XTH and YTH in succession and the periods of conduction (under (a)) of the main thyristors 1TH, 2TH, . . . 6TH in sequential firing by the regulator RGT, appears from FIG. 7. It is shown that the adjunct commutation circuit, except for the auxiliary thyristors XTH and YTH, does not introduce in the system any new element that would not be required at high speed and high load in the LCI mode of operation of the drive. The original power factor controlling parallel bank C has merely been reconfigured as $C_d$ having a special and smaller section $C_c$. Both banks contribute to the generation of leading VAR's as needed for LCI operation. The commutation circuit includes inductors $L_c$, but these are needed anyway in the LCI mode (see FIG. 3). An auxiliary pole has been added, indeed. However, this auxiliary pole, as it is conceived, does not need fast turn-off thyristors, and it does not undergo voltage stresses higher than the stresses normally applied to the bridge thyristors under LCI duty, and these will normally be much lower than is typical in a regular inverter pole. Therefore, relatively low rating, low cost pole design will do, not excluding the use of a regular inverter bridge having functions duplicating the XTH and YTH functions, should this be found desirable for the sake of design standardization.

The operation is as follows:

Assuming 6TH and 1TH are conducting in the bridge, and that thyristor 2TH is to be gated ON when 6TH is to be turned OFF, auxiliary thyristor YTH (associated with both 2TH and 6TH by its position between neutral point N' and the negative terminal TN) is gated ON together with the oncoming thyristor 2TH. If the offgoing and the oncoming thyristors were two of the odd numbered ones, it would be auxiliary thyristor XTH which would be gated for commutation. Now, it is assumed that capacitor $C_c$(s) is precharged at the voltage $V_c$ with the shown polarity (+ on the neutral point N'). Upon firing of YTH, node N' is forced to be at the potential $-V_{DC}$ of the negative DC-link bus TN. Therefore, capacitor Cc(s) starts discharging in the loop [N'-YTH-TN-6TH-J2-$L_c$(s)-s-$C_c$(s) and N']. A resonant discharge current builds up, controlled by the capacitance value of $C_c$ of capacitor $C_c$(s) and the inductance value $L_c$ of inductor $L_c$(s). This current opposes the forward current in 6TH until the net current in the device reaches zero. At that instant, 6TH becomes reverse-biased and the recovery process starts. This period of controlled decay of the current in 6TH is very brief and can be considered of negligible duration for the purpose of an analysis of the overall commutation process. Similarly, during such brief initial period, the voltage of capacitor $C_c$(s) decreases slightly, but this also can be ignored and capacitor $C_c$(s) will be assumed to be still charged at the initial voltage $V_c$.

As 6TH starts its recovery, voltage $V_c$ is applied to it as a reverse bias. Decaying in magnitude, this reverse bias will be maintained in polarity for a time sufficient for effective recovery. During recovery, the DC-link current $I_DC$ flows from the positive terminal TP of the DC-link via 1TH to mode J1, then, via inductor $L_c$(r) to node r. After that, it is divided into three paths. One third of $I_DC$ flows through capacitor $C_c$(r) to N'. Another third flows via capacitor $C_d$(rs) of the first bank and also, via capacitors $C_d$(tr) and $C_d$(st) of the first bank, to node s, then, via capacitor $C_c$(t), to node N'. The last third of $I_DC$ flows via capacitor $C_d$(tr) and also, via capacitors $C_d$(rs) and $C_d$(st), to node t, then, via capacitor $C_c$(t) to N'. From N', the whole current $I_DC$ returns through YTH to the negative terminal TN of the DC-link.

From the preceding it appears that, during recovery, capacitor $C_c$(s) is linearly discharged by a current equal to one third of the DC-link current $I_DC$. Therefore, the condition for safe recovery of 6TH is: $T_q < 3V_c C_c/I_DC$ where $T_q$ is the recovery time of the thyristor. For a given value of $V_c$, capacitor $C_c$ is to be selected of sufficiently high value to ensure recovery for the highest anticipated value of the DC-link current $I_DC$.

The flow of $I_DC$ will continue through YTH until capacitor $C_c$(t), which was initially charged as shown in FIG. 6, be discharged completely, so that there be zero volts across it. At that moment, the fraction of $I_DC$ reaching node t will flow via 2TH, rather than through YTH. This will cause node t to become clamped to the negative DC-link bus TN through conducting 2TH. From then on, the lowest impedance path for all of the DC-link current IDC is via capacitor bank $C_d$ and through 2TH. No part of $I_DC$ flows through the $C_c$ branches anymore. As a result, YTH is turned off immediately.

The choice of the value of the commutation voltage $V_c$ is primordial in establishing a safe recovery condition. It can be shown that $V_c$ depends upon the magnitude of the line-to-neutral load voltage $V_L$ and upon the power factor angle $\phi$ of the fundamental load current with respect to the fundamental load voltage, which is as follows: $V_c = V_L \cos \phi$.

Figure 8:
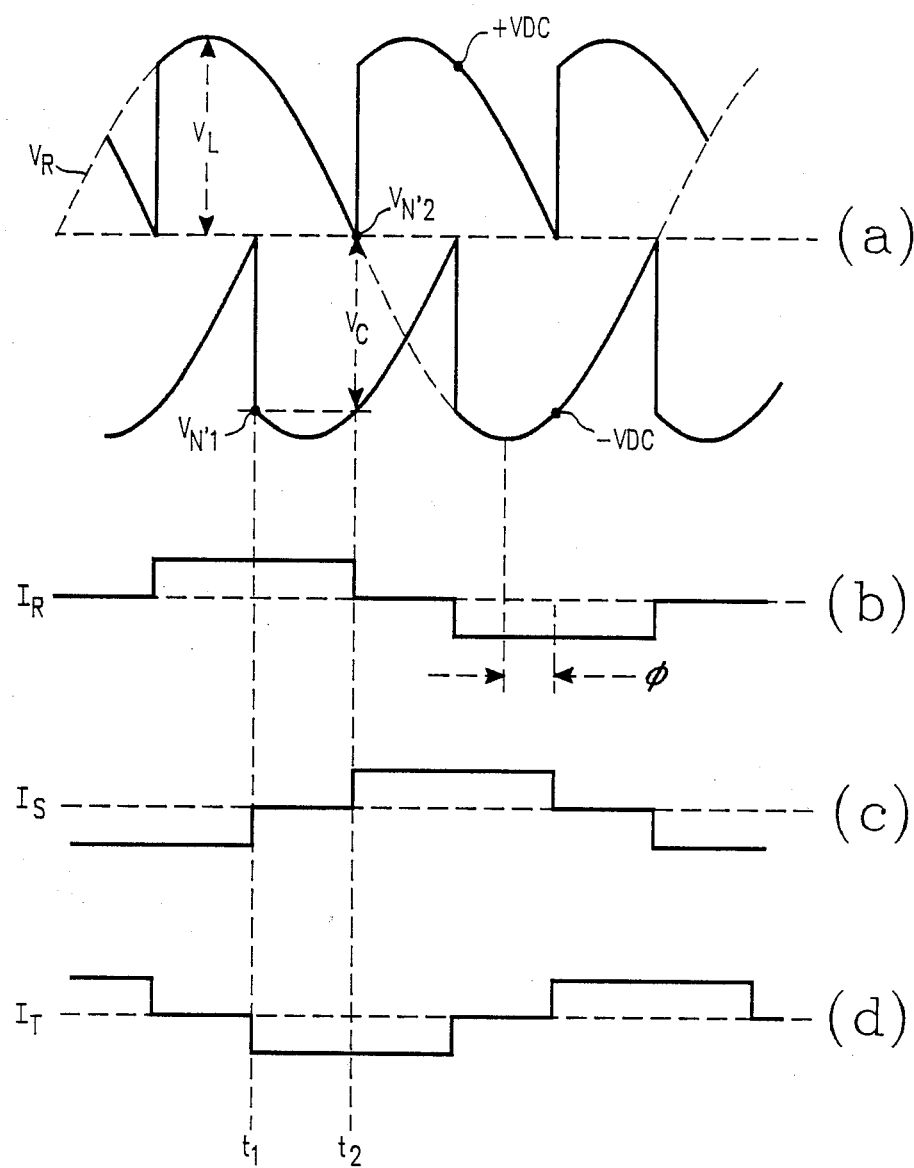
FIG. 8 provides curves associating the commutation voltage, the load voltage and the power factor, in relation to the load currents.

In this respect, while FIG. 7 shows under (a) the periods of conduction of thyristors 1TH-6TH and under (b) the commands from XTH and YTH, FIG. 8 shows the relationship between $V_c$, the load voltage and the power factor. The solid line curve under (a) represents the waveform of the positive DC-link bus voltage (+VDC) and of the negative DC-link voltage (−VDC), referred to the motor neutral N (see FIG. 6). FIG. 8 illustrates the situation when the load current IR is lagging the load voltage VR by 30°. At instant t1 for currents IS and IT (under (c) and (d)) there is turn-OFF, say of 6TH upon the oncoming of 2TH (as shown under (a) in FIG. 7). When 2TH starts conducting (current IT under (d)), the potential of node N' is the same as $-V_{DC}$ (as shown by the dot at $V_{N'1}$. During the subsequent 60°, the potential of node N does not vary with respect to neutral point N of the motor. At time t2, (when 1TH is being turned OFF as shown under (a) in FIG. 7 by firing XTH and 3TH simultaneously), the potential of N' will be forced to $+V_{DC}$ by the conduction of XTH. This is represented by the dot at $V_{N'2}$ in FIG. 8. The sudden swing in potential of node N' represents the initial reverse bias applied to the offgoing thyristor, and it is the available commutation voltage Vc existing upon every occurrence of a commutation. FIG. 8 shows the situation with a power factor angle of 30°. Should the power angle be 90°, FIG. 8 shows that $V_C$ would be zero. Therefore, the proposed commutation circuit would become unworkable when the load power factor approaches 90°, as well as for low-load voltages. Low-load voltages occur at very low speed. This is the situation at the initial start up of the motor drive. Some sort of commutation assistance appears to be required at very low speed, like for the synchronous motor drives. It is known to use a "pulse" mode for forced commutation at very low speed, a mode in which the DC-link current is periodically driven to zero by the line side converter. This mode involves up to about 10% of the speed to be attained. See for instance U.S. Pat. No. 4,443,747 of Chausse et al. This approach could be used up to 10% of speed. Then, the pulse mode can be discontinued and commutation with the commutation circuit according to the present invention will be effected. Once the speed has reached high enough levels to yield a load power factor that is sufficiently leading, natural commutation with the parallel banks of capacitors ($C_c+C_d$) is possible and the commutation circuit according to the present invention can be switched off, namely by inhibiting gating of XTH and YTH. The drive can be safely operated in the LCI mode.

I claim:

1. In a load commutated inverter induction motor (LCI/IM) drive including an AC power supply, a converter for rectifying said power supply and outputting between two DC terminals, a thyristor bridge inverter for applying an AC voltage on input lines to the motor, a DC-link between said converter and said inverter, with the inverter bridge being mounted across said DC terminals, and a capacitor bank in parallel with the induction motor for providing a leading power factor; the combination of:

forced-commutation means interposed between said DC terminals and the input lines of the motor;

said forced-commutation means being actuated at low speed in relation to the oncoming and the offgoing thyristor of said bridge related to one DC terminal polarity;

said forced-commutation means being turned off by said parallel capacitor bank; and said forced-commutation means including auxiliary capacitor means operative for forced-commutation at low speed and operative with said parallel capacitor bank above low speed in providing said leading power factor.

2. The LCI/IM drive of claim 1 with said forced-commutation means including inductor means cooperating with said auxiliary capacitor means in forcing said offgoing thyristor to recover.

3. The LCI/IM drive of claim 2 with said forced-commutation means including switching means for discharging said auxiliary capacitor means through said inductor means and through said offgoing thyristor.

4. The LCI/IM drive of claim 3 with said induction motor being a three-phase motor, said auxiliary capacitors being wye-connected across said motor input lines with a node point therebetween, said switching means including two auxiliary switches operatively connected between said node point and a corresponding one of said DC terminals.

5. The LCI/IM drive of claim 4 with said capacitor bank being delta-connected.

6. The LCI/IM drive of claim 4 with said capacitor bank being wye-connected.

7. The LCI/IM drive of claim 4 with said inductor means being inductors inserted on said input lines for thyristor protection.

8. The LCI/IM drive of claim 4 with said auxiliary switches being alternately gated upon the occurrence of a thyristor which is next in the bridge firing sequence.

* * * * *